(12) United States Patent
Blackshaw et al.

(10) Patent No.: US 10,954,648 B1
(45) Date of Patent: Mar. 23, 2021

(54) MULTI-SENSOR MANHOLE SURVEY

(71) Applicant: Michael D Blackshaw, Vancouver (CA)

(72) Inventors: Michael D Blackshaw, Vancouver (CA); John K W Munro, Vancouver (CA)

( * ) Notice: Subject to any disclaimer, the term of this patent is extended or adjusted under 35 U.S.C. 154(b) by 0 days.

(21) Appl. No.: 16/602,303

(22) Filed: Sep. 9, 2019

Related U.S. Application Data

(60) Provisional application No. 62/731,928, filed on Sep. 16, 2018.

(51) Int. Cl.
*E02D 29/12* (2006.01)
*G01S 17/89* (2020.01)
*G06T 17/00* (2006.01)
*G01S 7/4865* (2020.01)
*G01N 21/954* (2006.01)

(52) U.S. Cl.
CPC ............ *E02D 29/128* (2013.01); *G01S 17/89* (2013.01); *G06T 17/00* (2013.01); *G01N 21/954* (2013.01); *G01S 7/4865* (2013.01)

(58) Field of Classification Search
CPC ....... E02D 29/128; G06T 17/00; G01S 17/89; G01S 7/4865; G01N 21/954
USPC .......................................................... 52/20
See application file for complete search history.

(56) References Cited

U.S. PATENT DOCUMENTS

| | | | | |
|---|---|---|---|---|
| 7,322,252 | B1* | 1/2008 | Rodgers | G01B 5/02 33/542 |
| 7,703,343 | B1* | 4/2010 | Rodgers | E02D 37/00 73/862.08 |
| 2008/0068601 | A1* | 3/2008 | Thayer | G01B 11/24 356/241.3 |
| 2013/0199792 | A1* | 8/2013 | Backes | E21B 43/36 166/335 |
| 2015/0090049 | A1* | 4/2015 | Kertesz | E03F 7/00 73/861.18 |
| 2016/0255254 | A1* | 9/2016 | Freeman | G03B 37/005 348/374 |
| 2019/0301873 | A1* | 10/2019 | Prasser | G06T 17/05 |
| 2020/0240794 | A1* | 7/2020 | Prasser | G01C 21/3446 |

FOREIGN PATENT DOCUMENTS

JP 10111129 A * 4/1998
KR 2019113104 A * 10/2019

* cited by examiner

*Primary Examiner* — Jeanette E Chapman

(57) ABSTRACT

This invention employs proprietary multi-sensor inspection systems that enable the acquisition of extremely accurate data and comprehensive assessments of maintenance holes and trunk sewers during operation. The invention maps fisheye camera data onto time of flight (TOF) laser data to provide rapid and accurate 3D data and full space angle video imaging of the interiors on manholes and other structures.

5 Claims, 2 Drawing Sheets

ManHole Survey System Schematic

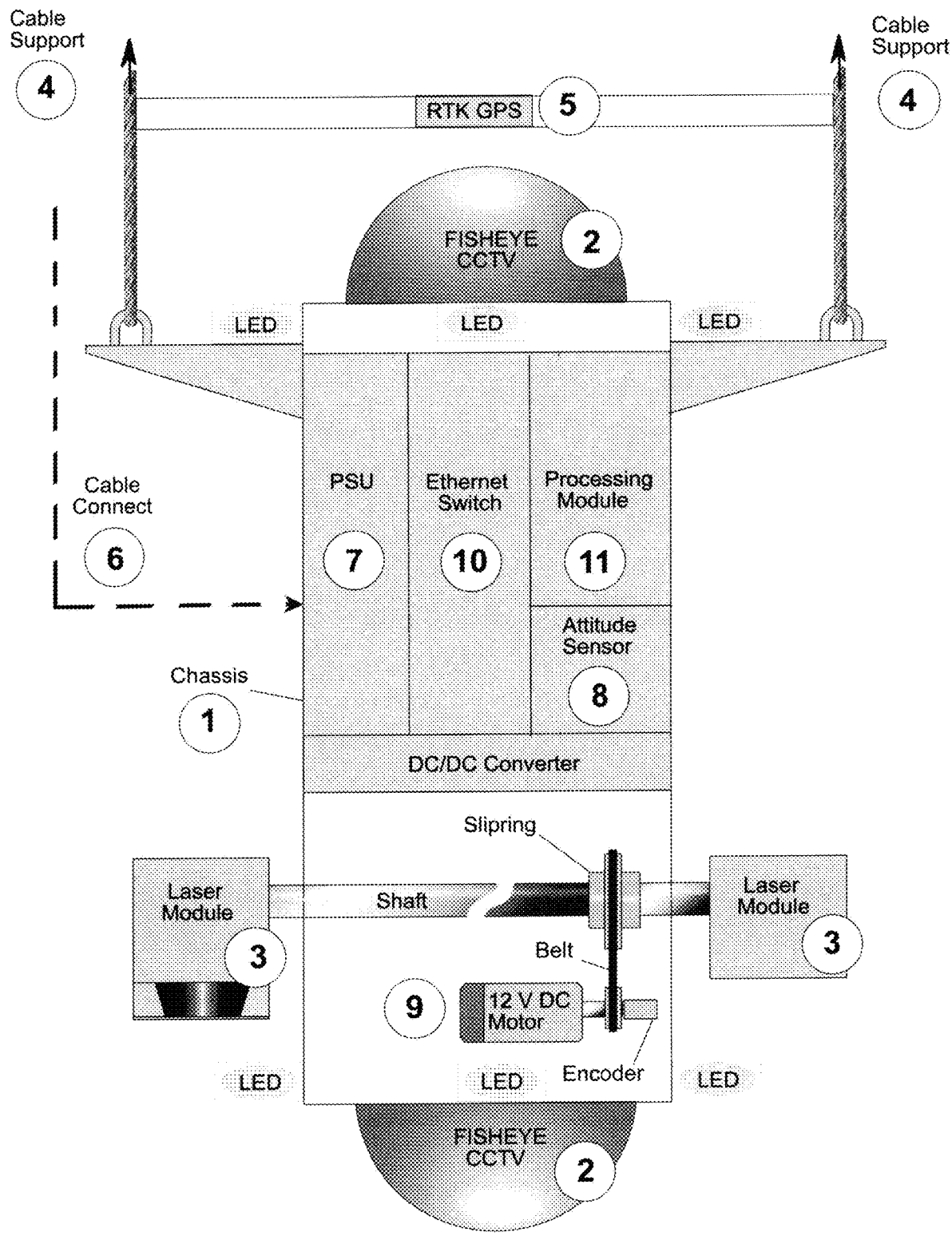
Figure 1 - ManHole Survey System Schematic

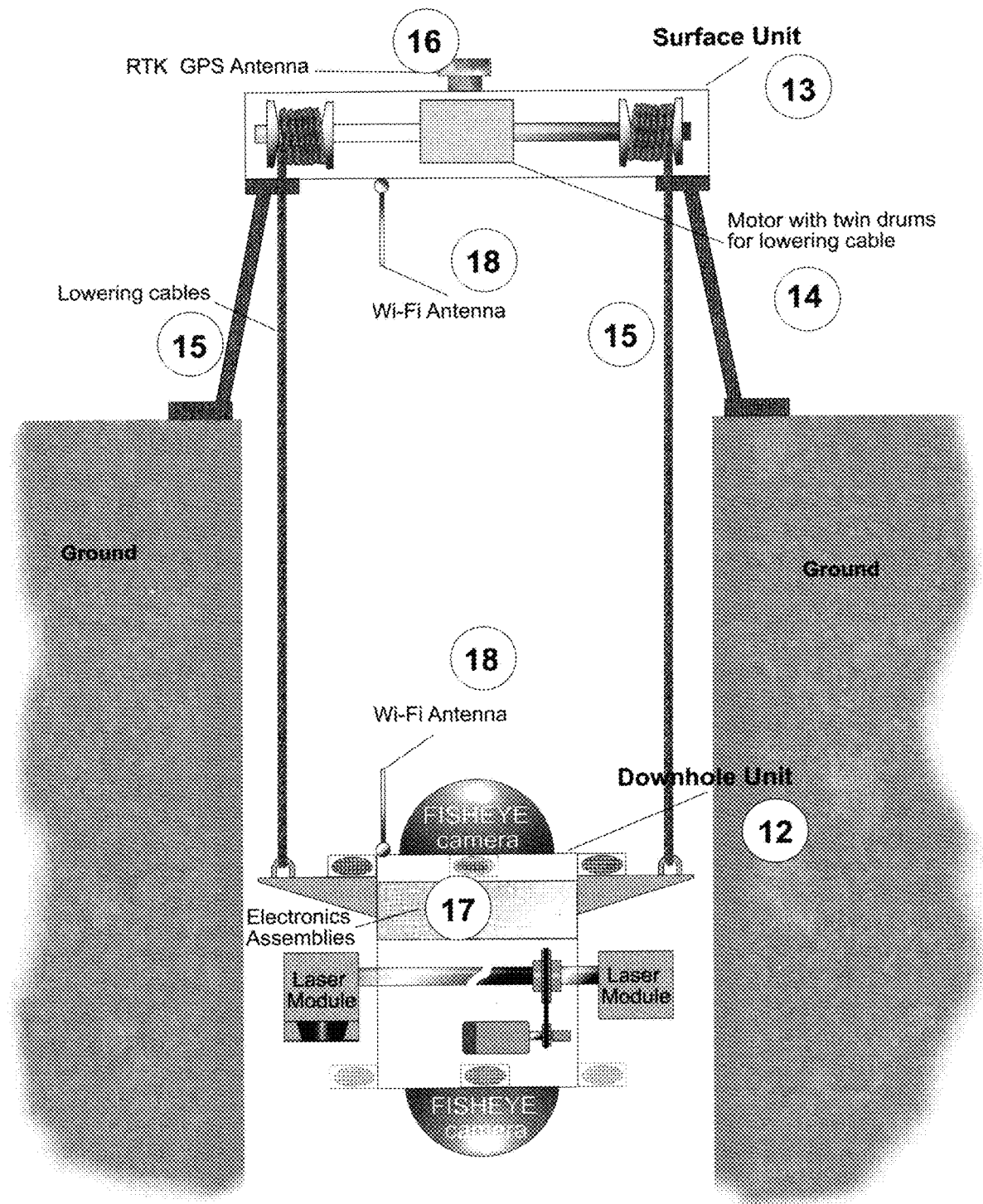
Figure 2 - ManHole Survey System with Wi-Fi Schematic

MULTI-SENSOR MANHOLE SURVEY

FIELD OF THE INVENTION

This invention has wide applicability in fields including the inspection of structures and assets such as maintenance holes, trunk sewers, mine sites, hydro dams, reservoirs, ports, river crossings, storage tanks, grain silos and bridge abutments using a wide range of technologies to create highly accurate condition assessments. Interested companies and organizations would include, but not be limited to, civil engineering firms and municipalities, mining firms and infrastructure asset owners throughout North America and the world.

BACKGROUND

Much of the groundwater and surface water that enters sewer systems does so through manholes and thus these are potentially a weak link in the drainage system. If manholes are not maintained and repaired when needed, then infiltration from groundwater can impact the collection system as a whole. From a structural standpoint, if there is a lot of corrosion within the manhole, then cave-ins can occur with the resultant system impacts and high repair costs.

AquaCoustic is a leading technology demonstrator for planning and execution of infrastructure rehabilitation for manholes and protection of the community. Our technology enables us to survey areas of concern, generate highly accurate profiles, geo-reference above and below water objects, and correlate this information to existing grids or coordinates. Such novel technology for trunk sewer and force main multi-sensor inspections enables us to decrease the cost of sewer maintenance.

Acronyms

3D Three Dimensional
CAD Computer Aided Design
CCTV Closed Circuit Television
DC Direct Current
F-O Fiber Optic
FOV Field of View
GE Gigabit Ethernet
GPS Global Positioning System
HD High Definition
IMU Inertial Measurement Unit
LED Light Emitting Diode
LiDAR Light Detection and Ranging
PC Personal Computer
PDF Portable Document Format
PSU Power Supply Unit
RTK Real-Time Kinematic and Differential
SLAM Simultaneous Location and Mapping
TOF Time of Flight
USPTO US Patent and Trademarks Office
WiFi Wireless Networking

Prior Art

Currently, there are no competitors in this specific market space. Available systems (from Panoramo, EnviroSight, CLUES and RST) employ multiple digital cameras mounted around a center body together with triangulation and stitching-based processing for image compilation. Platform ranges (i.e. depths attainable) are limited to a few tens of feet. The current competition does not have the specialized multi-sensor (including forward scanning laser) and processing capabilities (including machine vision) that are part of this invention.

A review of Prior Art within the US Patent Office (US-PTO) revealed little if anything with similarity to this invention or which could be extended to the scope of this invention by those expert in the art. In more detail:—

U.S. Pat. No. 7,703,343 Apr. 27, 2010 Apparatus for taking measurements in access manholes.
  This refers to a single distance meter that is designed to measure lateral lines coming into the system. The concept refers to an arm and angle sensors whereby a single distance measurement is made as the arm swings around. This is a lateral measurement only whereas the invention described herein concerns a full 3D image and I-ID point cloud.

U.S. Pat. No. 7,625,335 Dec. 1, 2009 Method and Apparatus for 3D optical scanning of interior surfaces.
  The concept is that of a rotating laser light with triangulation with a camera. The design concept has no similarities with this invention described herein; additionally, such a design concept would have a performance accuracy proportional to pipe size. This invention described herein is a totally different design concept based on rotating TOF lasers and laser platforms.

U.S. Pat. No. 6,922,234 Jul. 16, 2005 Method and Apparatus for generating structural data from laser reflectance images.
  This invention refers specifically to a laboratory apparatus experimental setup for generating structural data of a structure. The apparatus includes a scanning laser range finder that produces reflectance data of the structure. This invention described herein has no similarity to this Prior Art since we use both multi-sensors together with time of flight laser technology.

U.S. Pat. No. 9,885,218 6 Feb. 2018 Downhole Apparatus.
  This invention refers specifically to wireless short-range radio communication (2.4 Ghz radio spectrum) between two tractor-like platforms underground. This invention described herein has no relationship to this particular Prior Art; more specifically, the Wi-Fi potential (see Extension 1 in this invention) is based on both system control and data collection/transmission between a below-ground Manhole Survey System and the above ground Control Station. Additionally, Wi-Fi technology chosen (but not limited to) is that of 10GE (for example).

US20130199792A1 Subsea collection and containment system for hydrocarbon emissions by RM BACKES
  This invention refers to a rapidly deployable and flexible enclosure systems for collection, containment of hydrocarbon emissions from compressed oil, gas well systems etc. No relevance or relationship to the invention described herein.

US20150090094A1 by R KERTESZ et al. Flow imaging and monitoring for synchronized management of wide area drainage.
  This invention describes a manhole system for flow imaging and monitoring water flow and water constituents—this invention has no relevance or relationship to the invention described herein (which focuses on measurements of the manhole itself (size, shape, condition, etc.)).

US20160255254A1 Wastewater monitoring system and method by BC FREEMAN.

This invention employs a camera in a fixed location in a wastewater pipe and takes photos at a fixed time increment which is then used for a time lapse video representation of waster water flow. This invention has no relevance or relationship to the invention described herein (which focuses on measurements of the manhole itself (size, shape, condition, etc.)).

JP10111129A Manhole by Tamio NARUSE.

This invention concerns the provision of an accurate survey (location) point of the manhole itself, this invention has no relevance or relationship to the invention described herein (which focuses on measurements of the manhole itself (size, shape, condition, etc.)).

KR2019113104A by GI L M et al Manhole survey robot capable of performing manhole irradiation The Korean invention focuses on a manhole irradiation unit—comprising a single photographing module and a microwave (LiDAR) module. Invention focuses on irradiation of the manhole itself (to sanitize) together with a camera to collect images of such. From the drawing contained in the Korean patent, we believe that the term LiDAR (light detecting and ranging) is used erroneously—the Korean patent description does not refer to using a laser pulse to scan the inside of the manhole but most likely some kind of triangulation laser that uses the laser to triangulate a laser line on the manhole surface with the camera.

The invention described herein has a completely different function based on scanning the manhole to create highly accurate CAD drawings with elevations. Whilst this Korean invention uses a camera to collect images, the invention described herein employs dual panoramic video (fisheye) cameras that collect video that is then image de-warped to provide detailed images looking up, sideways and down.

The invention described herein has two external profiling lasers fastened to each side of the video camera module. These dual, rotating Time of Flight (TOF) lasers to collect a very dense point cloud (x,y,z) to which we then overlay with the video pixel color data from our dual fisheye cameras and thus establish a photo realistic 3D CAD drawing of the inside, and condition, of the manhole.

This invention described herein enables very long ranges (up to say +−25 m radius as a typical example) thus allowing both manhole and chamber analysis to be accurately performed.

Additionally, using such dual cameras and dual TOF lasers, the invention described herein enables surface condition capture of the inside of the manhole to be established and viewed. Thermal fisheye cameras on each side of the camera module allow it to identify rebar close to the concrete surface and water infiltration.

Additionally, the invention described herein enables further sensors such as gas sensors, temperature probes and microphones to be mounted for increased manhole hole state information to be derived.

In summary, the invention described herein is totally distinct from the Korean invention and is not an obvious design that could have been developed by someone skilled in the art of manhole irradiation and photography.

SUMMARY OF THE INVENTION

The invention employs dual time-of-flight (TOF) lasers offset by 90 deg in order to reduce cross scattering and coupled with dual Fisheye cameras. The TOF lasers will be rotating continuously about a horizontal axis thus providing range information over a wide field of view (FOV). Simultaneously, the dual fisheye high definition (HD) cameras will image the environment both looking upwards (for the underside of the top of the manhole) and downwards. The invention then maps the pixel information onto the laser data. Such a design concept is aimed at producing a much better point cloud than existing systems and technologies which rely on optical triangulation and image stitching. This invention in both hardware and software technologies provides rapid and accurate 3D data and full space angle video imaging of manhole interiors.

Advantages

This invention employs proprietary multi-sensor inspection systems that enable the acquisition of extremely accurate data and comprehensive assessments of maintenance holes and trunk sewers during operation. Typical performances are shown below:—

- This invention can accurately measure (1 cm) distances from 50 mm to 6 m in one deployment.
- This invention provides rapid and accurate 3D data and full space angle video imaging of manhole interiors, with typical (but not limited to) performance of:
  Depth: >30 m max 300 m
  Fast: <15 min per manhole
  Accurate 3D data: better than 1 cm accuracy
  Data delivery in a compatible, "easy" data format, viewable and measurable in-browser, or standard publicly available software including 3D PDF, full-angle video, 3D point cloud.
- This invention provides a much larger depth range than current competitive designs and technologies.
- This invention provides accurate and rapid "computer ready" measurable data of manholes, with currently unmatched performance and customer benefits.
- This invention is based on a system platform capable of evolving to incorporate/integrate a wide range of multiple sensors.

DESCRIPTION OF THE INVENTION

Mode of Operation

Upon arrival at the manhole site to be surveyed, the invention is removed from the vehicle and mounted on a tripod. Deployment is rapid and simple, enabling time-efficient, low-cost inspections. The invention incorporates a range of differing sensors that are used to map, in detail, the inside of the manhole. Under computer control, the system operator then slowly lowers the invention into and down to the floor of the manhole where, from the moment of entering the manhole, the various sensors in the invention (cameras and Time of Flight, TOF, lasers) start collecting data on the manhole interior (e.g. surface condition, manhole size, depth/diameter, etc.). Information collected is based on both photographic as well as highly accurate range information based on measurements of the time taken for a laser signal to bounce off targets (i.e. the manhole wall) and return to origin. Such laser mapping data enables mapping of pipe cross sections to within 5 mm accuracy independent of diameter. TOF detects objects regardless of surface or lighting and is less prone to calibration/alignment issues than laser triangulation. Large variations in geometry (e.g. 0.05-27 m) can be interpreted during a single run, and additional surface information such as cracks and areas of infiltration can be gathered. The invention incorporates dual TOF lasers such that accurate and 360 deg laser data is captured on a single manhole scan. Such sensor data is recorded onboard the invention for subsequent uploading to the control computer above ground and data analysis and HD image compilation.

Scanner compactness allows for highly portable platforms and application in tight geometries. This invention is based on a system platform capable of evolving to incorporate/integrate a wide range of multiple sensors (CCTV, laser, gas sensors, temperature probes and microphones, etc.).

FIG. 1 shows the Manhole Survey System schematic. The invention comprises the following principal assemblies:—

An above-ground cable winch system of some description together with system control and data collection through a PC platform.

A system chassis 1 mounting dual Fisheye CCTV cameras 2 (one atop and one at the bottom) of the system chassis together with multiple LED lighting assemblies.

A system chassis 1 mounting dual TOF lasers 3, one mounted on each side of the system chassis 1.

A cable support system 4 for suspending the invention and enabling deployment and retrieval of the system, including a mounted Real-time Kinematic and Differential (RTK) GPS assembly 5.

An electrical connect assembly 6 comprising both power and Ethernet connectivity between the below ground system and the above ground PC platform.

A system chassis 1 within which is mounted:—
Power supply (PSU) 7
Solid state attitude sensor 8
DC motor, controller and encoder for TOF laser module 3 movement and control 9
Ethernet switch 10
CCTV and TOF laser interfaces
Processing Module 11 for capturing and forwarding laser data and camera pixel information to the above-ground computing platform.

The dual TOF laser modules 3, which overlap in azimuthal coverage, rotate about a horizontal axis in a continuous fashion thus providing detailed range and location information for the whole manhole during system descent. The dual TOF laser modules 3, are offset by 90 degrees in order to minimize cross-scattering effects. Simultaneously, the dual CCTV cameras 2 with LED lighting (as required) provide HD imaging capability (with digital zoom if required) both in a downwards direction into the manhole as well as in an upward direction thus allowing the underside of the manhole or chamber to be studied.

Data collection from both the TOF lasers 3 and CCTV cameras 2 is managed by a Processing Module 11 and is then transmitted through a wide bandwidth Ethernet connection module 10 to the above ground PC platform. The latter permits an initial review of the recorded data during the mission itself to ensure the system is functioning correctly, etc.

Post processing of the raw digital data is performed offsite through the use of through proprietary and expert signal processing which incorporates (in part) novel and unique Simultaneous Localization and Mapping (SLAM) algorithms.

The invention also includes novel extensions of the above system design and concept. More specifically:—

Extension 1: Wi-Fi rather than Fiber Optic/electrical cable communication

In this extension to the invention, this multi-sensor manhole system concept would replace power/F-O/Ethernet cables between above/below ground elements with a WiFi communications concept. With such a design concept, the system physical footprint would be reduced and communications between above/below ground assemblies would be easier and of higher reliability/ease/robustness.

FIG. 2 shows the Manhole Survey System schematic including WiFi technology.

The manhole survey system is depicted being lowered into the manhole via a Surface Unit comprising a motor drum-based winch system and cables together with a mounted RTK GPS assembly. A Processing Module contained within collects both TOF laser and Fisheye CCTV camera data and consolidates into recorded data which is then passed via WiFi modules mounted on top of the system and the underside of the Surface Unit. The Surface Unit then stores such recorded data by suitable means for both on-site and subsequent off-site post processing.

Whilst power would be provided from the surface, this concept is not limited to such and would also include the use of other techniques/technologies, such as battery power in the System.

Extension 2: Multi-Sensor Pipe Meander and Absolute Pipe Positioning.

Over time, the condition and specific location of underground piping will change due to such factors as material wear, terrain movement, pipe repairs, and changes to construction design, 'as-built' drawings and pipe construction. Access to pipes is typically only through periodic (on the surface) manholes. There is a clear requirement to be able to establish the detailed pipe condition and accurate position of such underground piping—referred to as "3D imaging for meandering underground pipes". By mounting this invention on a tractor system (for example) or a float system, this invention offers capability to provide accurate 3D surveys and absolute position data of underground structures, such as pipes and tunnels, whose true underground position cannot be determined using GPS-based navigation. This would be achieved by combining the data from state-of-the-art inertial measurement units (IMUs), 3D LiDAR scanners and optical cameras into a consistent 3D representation of the structures.

Disclosure of the Invention (a) Has the Invention been disclosed outside of your company (e.g., disclosed in white paper posted on company website) or commercialized (e.g., a press release announcing availability for sale of a product including the invention) in any way?
No.
(b) Invention Dates
Invention conceived on: 27 Oct. 2017
Location where invention was conceived: AQC, 188 West 6$^{th}$ Avenue, Vancouver, BC CANADA V5J 1J6
Who was there when the invention was conceived and sorted out? Mike Blackshaw Description of the embodiments of the invention in which an exclusive property or privilege is claimed are defined as follows:

1. A manhole survey system design and platform employing multi-sensor technology in a small physical footprint and capable of generating a high definition (HD) (x,y,z) point cloud to very high accuracy and comprising:
- an above-ground cable winch system of some description together with system control and data collection through a PC platform
- dual Fisheye CCTV cameras (one atop and one at the bottom) of the system chassis together with multiple LED lighting assemblies
- dual TOF lasers, one mounted on each side of the system chassis
- a cable support system for suspending the invention and enabling deployment and retrieval of the system, including a mounted RTK GPS assembly
- a cable connect assembly comprising both power and Ethernet connectivity between the below ground system and the above ground PC platform
- a system chassis within which is mounted:—
  - Power supply (PSU)
  - Solid state attitude sensor
  - DC motor, controller and encoder for TOF laser module movement and control
  - Ethernet switch
  - CCTV and TOF laser interfaces
  - Processing Module for capturing and forwarding laser data and camera pixel information to the above-ground computing platform.

2. The design and platform in claim 1, including but not limited to sensors such as fisheye camera, TOF laser and RTK GPS.

3. The design and platform in claim 1, whereby communication between Surface and Underground assemblies can either be fiber/electric cable or wireless (Wi-Fi) thus enabling less infrastructure and higher reliability/ease/robustness.

4. The design and platform in claim 1, incorporating the use of dual time of flight (TOF) laser technology for high laser range and thus large pipe diameter capability versus staring array (fixed fan beam) laser concepts.

5. The design and platform in claim 1 incorporating dual, synchronous scanning/rotating TOF laser sensors with a 90-degree offset between each so as to minimize cross-scattering effects and enabling a HD (x,y,z) in a volumetric sense with no gaps in coverage.

* * * * *